Figures 1, 2:
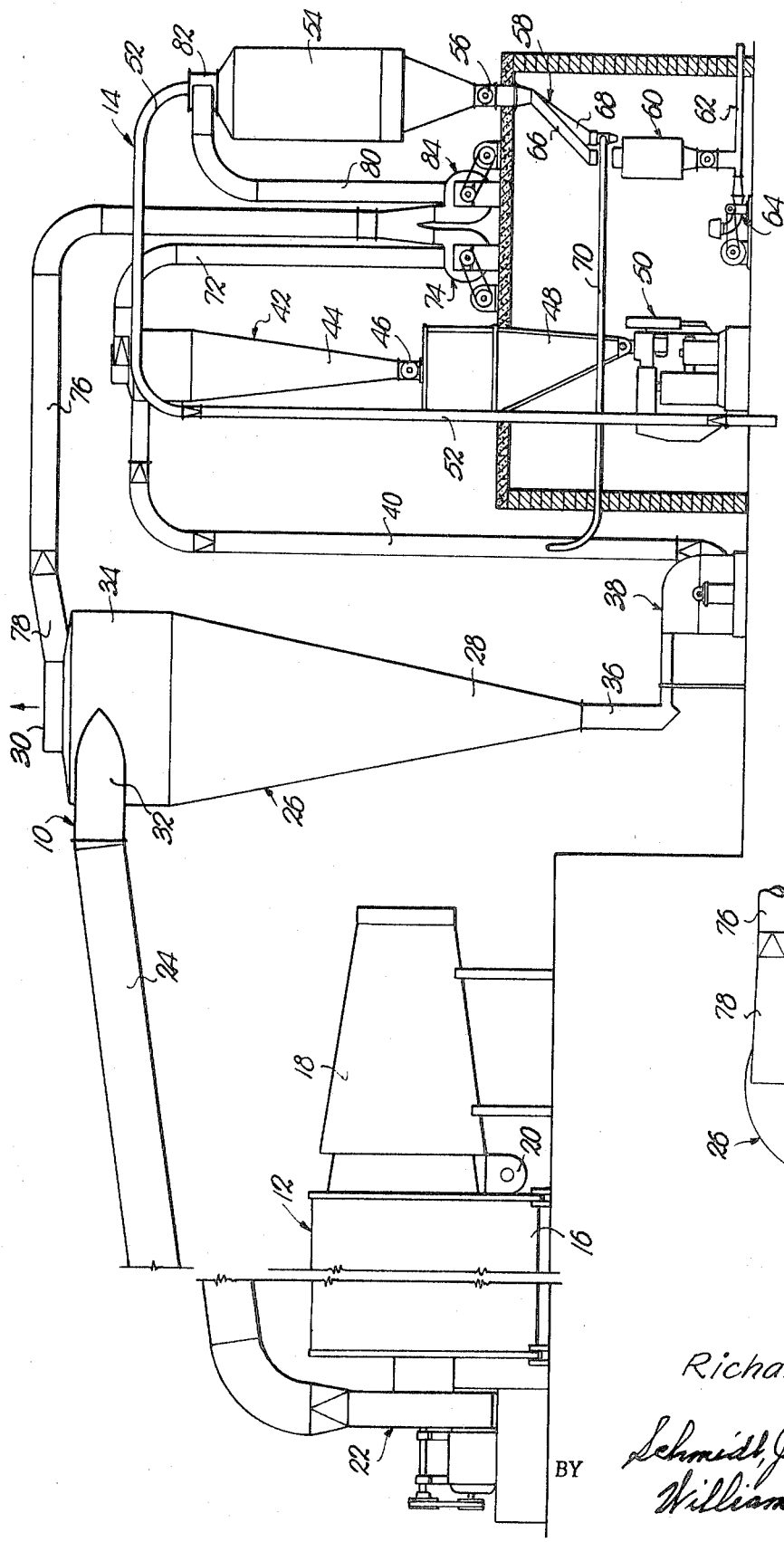

# United States Patent

Ronning

[15] 3,643,404
[45] Feb. 22, 1972

[54] METHOD AND APPARATUS FOR ENHANCING THE SEPARATION OF PARTICULATE MATERIAL FROM AN EFFLUENT STREAM

[72] Inventor: Richard L. Ronning, 9714 West 91st Terrace, Overland Park, Kans. 66212

[22] Filed: Jan. 28, 1969

[21] Appl. No.: 794,652

[52] U.S. Cl. ............................................55/92, 55/238, 99/8, 99/235
[51] Int. Cl. ..............................B01d 7/16, A01f 17/84
[58] Field of Search .................55/52, 238, 349, 33; 210/312, 210/512; 99/8, 17, 235, 246

[56] References Cited

UNITED STATES PATENTS

| 467,264 | 1/1892 | Raymond | 55/92 |
| 691,485 | 1/1902 | Porbeck | 55/238 X |
| 1,762,338 | 6/1930 | Kreisinger | 55/238 X |
| 2,069,389 | 2/1937 | Peebles | 55/92 |
| 2,588,106 | 3/1952 | Frangquist | 55/92 |
| 2,963,109 | 12/1960 | Brookman et al. | 55/349 X |
| 3,515,276 | 6/1970 | Comer et al. | 210/512 X |
| 2,522,342 | 9/1950 | Byers | 99/235 R |
| 2,772,642 | 12/1956 | Lindl | 99/8 D |
| 2,803,545 | 8/1957 | Randolph | 99/8 D |
| 3,292,346 | 12/1966 | Adams | 55/33 |
| 3,477,203 | 11/1969 | Luge et al. | 55/84 |

Primary Examiner—Charles N. Hart
Attorney—Schmidt, Johnson, Hovey and Williams

[57] ABSTRACT

A method and apparatus for minimizing the particulate material content from an effluent stream of gases by enhancing the efficiency of centrifugal separation. A conduit feeds a stream of cooling gases into the separator to cool the effluent stream closer to its dew point. Condensing moisture collects on the particles, augmenting the mass of each particle so that separation by centrifugal force is enhanced.

10 Claims, 2 Drawing Figures

PATENTED FEB 22 1972
3,643,404

INVENTOR
Richard L. Ronning

BY
Schmidt, Johnson, Hovey,
Williams & Bradley
ATTORNEYS

METHOD AND APPARATUS FOR ENHANCING THE SEPARATION OF PARTICULATE MATERIAL FROM AN EFFLUENT STREAM

This invention relates to material handling apparatus, and more particularly, to apparatus for separating particulate material from a stream of effluent gases.

Concern over air pollution has resulted in increased attention to the need for removal of all or substantially all of the contaminating material from the effluent stream of gases before the stream is discharged to the atmosphere. Most objectionable contaminants, including smoke, are entirely or substantially comprised of particulate material.

The simplicity of construction and economies of operation afforded by centrifugal type separators make these structures particularly well suited for separating solid, particulate material from a stream of gases. For example, centrifugal separators are commonly used in the crop dehydration industry to separate the dried product from the heated dehydration gases emanating from the dehydrator drum. It is also common practice to utilize centrifugal separators to remove the comminuted product and "fines" from the airstream which pneumatically conveys the product through successive processing stations following dehydration.

Separators of this type rely on centrifugal force to move the particulate material along a different path from that of the gases when the stream is passed through the separator at the required velocity. The separators cannot effectively separate particles having so little mass and high drag coefficient that insufficient centrifugal force is generated to produce the requisite alteration of particle path. As a result, whereas they are highly adequate for removing most material, the separators do not effectively remove minute dust, smoke and other contaminants (hereinafter generally referred to as "dust") so that the discharge from the dehydration plant to the atmosphere meets all pollution control restrictions.

Various filters and anticontaminant accessories have been suggested for controlling the emission of contaminating particles from plants of this type. These accessories are extremely expensive to install and operate. Many of them also inhibit the operation of the dehydrator plant and render the entire operation less economical than is necessary for successful competition with other processing methods.

It is, therefore, the primary object of this invention to provide a method and apparatus for increasing the efficiency of centrifugal separators.

It is also an important object of the invention to provide a method and apparatus which is capable of "scrubbing" the discharge emanating from an industrial operation such as a dehydration plant to remove contaminating dust and other particulate matter therefrom.

Still another object of the present invention is to provide apparatus which may be economically fabricated and installed on existing dehydration plants with a minimum of alteration to such equipment.

A yet further object of the invention is to provide a method and apparatus which takes advantage of the inherent high-water vapor content and high temperature of the flow emanating from a crop dehydrator drum, together with the cooler temperature of the pneumatic conveying airstream to increase the mass of particles otherwise too light for proper separation by a centrifugal separator, and to remove such particles to prevent their discharge to the atmosphere.

These and other objects of the invention will be further explained or will become apparent from the following specification, claims and the drawing.

In the drawing:

FIG. 1 is a fragmentary, partially schematic side elevational view of a crop dehydration plant embodying apparatus constructed pursuant to the principles of this invention; and FIG. 2 is a fragmentary, top plan view of the primary centrifugal separator and attached conduits of the plant shown in FIG. 1.

A dehydrator plant embodying the apparatus of this invention is broadly designated 10 in the drawing and includes a dehydrating unit 12 coupled with processing apparatus broadly designated 14. The unit 12 comprises an elongated, cylindrical dehydrating drum 16 operably connected to a furnace 18 for producing the heated dehydration gases for drying a crop such as alfalfa or the like. The crop is introduced into the forward end of drum 16 by conveyor means 20, and the crop progressively moves toward the discharge end of drum 16 under the influence of currents of dehydration gases pulled by a fan 22. The dried material entrained in the stream of heated gases travels through conducting means in the nature of an enlarged conduit 24 and into a centrifugal separator 26.

Separator 26 comprises the primary separation means for removing the solid product from the dehydration gases. In the embodiment shown, the primary separator 26 is constructed in the nature of a cyclone separator. The nature and construction of separators of this type are so well known to those skilled in the art that no detailed description of the separator is necessary. It suffices to say that the stream flowing through conduit 24 moves at sufficient velocity that the circular path defined by separator 26 for the stream results in the collection of a substantial portion of the particulate material into the conical section 28 while the gases ultimately are discharged from outlet 30 in the top of the separator. It should be noted that the separator inlet 32 is disposed substantially tangential to the upper cylindrical portion 34 of separator 26.

The solids collected in the primary separator 26 gravitate to an inlet 36 for comminution means in the nature of a hammer mill 38. The mill shreds and further comminutes the material which is subsequently pneumatically conveyed through a pipe 40 to a centrifugal separator 42. Separator 42 is also of conventional cyclone construction and comprises the secondary separation means used for removing the comminuted particulate material from the conveying airstream. Manifestly, it will be realized that the term "airstream" is meant to embrace, in addition to air, such dehydration gases as may be conducted with the product through the processing apparatus. The major portion of the particulate product gravitates into the conical portion 44 of separator 42 and is then transferred through a rotary air lock 46 into a meal bin.

Meal from bin 48 is processed, in the example illustrated, in a pelleting mill 50 to produce pellets suitable for animal feed or the like. The pellets are then pneumatically conveyed through a tube 52 into the upper end of a cooling tank 54. Air drawn through the pellets in tank 54 reduces the temperature thereof and the pellets are subsequently transferred through a rotary air lock 56 to a mechanical sifter 58 prior to transfer through scales 60 to a pneumatic conveying tube 62. Manifestly, pump means 64 is operably coupled with conveying tube 62 to provide the airstream for conveying the pellets to a point of discharge (not shown).

Sifter 58 comprises an elongated chute 66 which separates the whole pallets from the fine material, broken pellets and dust which gravitate into a second chute 68. This fine and particulate material is returned to pipe 40 by a tube 70 in communication with chute 68 and pipe 40. This material is mixed with the material emanating from mill 38 and is reintroduced into the processing cycle for pelletizing subsequently by mill 50.

The fluid discharge from the secondary separator 42 is conducted through a conduit 72 and blower 74 to conduit means 76. The latter is coupled with an inlet 78 extending tangentially from the cylindrical portion 34 of the primary separator 26. Accordingly, the material traveling through conduit 76 may be reintroduced through inlet 78 to the interior of separator 26 and the material travels in the same direction as the material entering separator 26 through material inlet 32. A pipe 80 is in fluid communication with the upper cylindrical portion 82 of tank 54, and the inlet of pipe 80 is disposed in relatively close proximity to the outlet of tube 52 which conducts the pellets to tank 54. A fan 84 in fluid communication with pipe 80 produces negative fluid pressure in the latter to draw dust and hard to remove particulate material from the stream of pellets entering tank 54. This dust and particulate material is introduced into conduit 76 for transfer through the latter to the primary separator 26.

It should be noted that pipe 40, secondary separator 42, conduit 72, pipe 80, cooler 54, and tube 52 all operate at negative fluid pressure. Accordingly, all dust and particulate material traveling through these portions of the structure tend to remain within their confining structures rather than escaping to atmosphere. This minimizes the contamination of the atmosphere by such particulate material which might otherwise occur from minute openings, cracks or the like.

The dust and hard to remove material which is drawn through conduit 76 from the discharge of the secondary separator 42 and from cooling tank 54 is entrained in an airstream which is substantially cooler than the temperature of the stream emanating from the dehydrator through conduit 24. The latter is necessarily at an elevated temperature as a result of the operation of furnace 18. Further, the stream emanating from dehydrator drum 16 contains a high content of water vapor. During normal operation in the dehydration of a crop such as green alfalfa or the like, the gases flowing into the primary collector from the dehydrator drum may range from temperatures of about 200° to about 400° F. The water content of these gases as a result of the driving of the water from the green crop is normally such that the water vapor, air and products of combustion in the primary separator have a dewpoint ranging from approximately 110° to approximately 175° F. Actually, the great bulk of dehydrator plant operation wherein the plant is utilized at 50 percent or more capacity in dehydrating a green crop such as chopped alfalfa, will result in temperature of the stream in conduit 24 ranging from about 240° F. to about 300° F. The dewpoint of this mixture in separator 26 is normally between approximately 165° and approximately 175° F.

The temperature of the return stream passing through conduit 76 which is introduced into the primary separator 26 is substantially cooler and will normally range from approximately 90° to 130° F. It has been found that the introduction of the cooling stream of gases which contain hard to remove, relatively light particles of matter collectively referred to herein as "dust," results in the lowering of the temperature of the mixed gases, water vapor, air and particulate material in separator 26 to approach the dew point of the mixture. This, in turn, results in condensation of water which occurs on the relatively light particles introduced to the separator through conduit 76. It may be theorized that these minute particles serve as nuclei to enhance the condensing of the moisture and this condensation occurs 'n the surfaces of the particles.

In any event, the condensing of the water from the water vapor on the particles serve to augment the masses of the particles. These particle mass increases result in the generation of sufficient centrifugal force under the velocities at which the particles are moved through the separator so that the particles follow paths permitting removal of the particles from the separator is substantially increased. It has been found that the efficiency of the primary separator utilized in a dehydration plant of the type illustrated and described is sufficient, when the method of this invention is utilized, to scrub the discharge emanating from the separator enough that it is substantially free from particulate material which is objected to by air pollution control authorities. This cleaning of the effluent is accomplished very economically and without the necessity for substantial alteration of the equipment or method of operation of the dehydrating plant.

Since the method of this invention contemplates passing of the effluent stream containing objectionable particulate matter through a medium of gases having water vapor as a constituent, and thereby cooling the vapor to approach the dew point thereof, it can be appreciated that the method could be successfully adapted to the cleaning of effluent streams other than those attendant upon a crop dehydration operation. Nevertheless, it will also be readily appreciated that the inherent elevated temperature and high-water vapor content of the discharge from the drum into the primary collector of a dehydration plant such as is described, together with the availability of relatively cool fluid containing objectionable and hard to separate particulate matter such as dust and the like, renders this method and apparatus particularly well suited for effectively cleaning the discharge from crop dehydration operations.

While the relatively cool effluent stream from conduit 76 may conveniently be reintroduced into the mixture of hot gases and water vapor in the primary separator 26, it is contemplated that the mixture of these streams could occur upstream from the primary separator 26. Manifestly, the condensation of water on the hard to separate particles is relied upon for increasing the masses of such particles for effective separation. This increase in effective mass could be accomplished prior to the entry of the particles into the primary separator.

Having thus described the invention, what is claimed as new and desired to be secured by Letters Patent is:

1. Apparatus for separating particulate material including fines from an effluent stream containing a high-water vapor content wherein the temperature of the effluent stream and particulate material is at a level above the dewpoint of the water vapor therein:

primary separation means including an upright centrifugal separator having an inlet, a material discharge in the lower portion thereof, and a gas outlet at the upper end thereof;

means coupled with the inlet and adapted to be coupled with a source of said heated effluent stream containing said particulate material for conducting the stream to the primary separator;

structure including secondary separator means for removing a substantial portion of said material from an airstream;

means operably coupled with the secondary separator and the material discharge of the primary separation means for pneumatically conveying the material collected in the primary separator to the secondary separator;

conduit means communicating the structure with the primary separator for conveying all of said airstream and the remaining portion of said material back to the primary separator;

pump means operably associated with said conveying and conduit means for moving said streams through the primary separator at a velocity to cause separation of the material from said streams; and means operably associated with said conduit means for lowering the temperature of the airstream returned to the primary separation means to a level sufficiently below the temperature level of the effluent and particulate material entering the primary separation means to effect condensation of sufficient water vapor therein on the fines in the primary separation means to enhance separation thereof and thus preclude discharge of undesirably quantities of particulate material from the primary separation means into the atmosphere.

2. Apparatus as set forth in claim 1, wherein said secondary separator means includes a centrifugal separator having its inlet coupled with said conveying means and its outlet coupled with said conduit means.

3. Apparatus as set forth in claim 2, wherein said secondary separator means also includes a sifter for mechanically removing material from the airstream, a tube coupled with the secondary separator and the sifter for pneumatically conveying said material from the separator to the sifter, and means placing said conduit means in communication with the sifter for returning the airstream and fine material to the primary separator.

4. Apparatus as set forth in claim 2, wherein is included material comminution means interposed in said conveying means for comminuting the material before the latter is introduced into the secondary separator.

5. Apparatus as set forth in claim 1, wherein is included a particulate material receiving cooler operable to receive collected particulate material and means communicating the cooler with said conduit means for directing cool air from the cooler to said airstream to lower the temperature thereof.

6. A method of separating particulate material including fines from a heated gaseous effluent stream containing a high content of water vapor wherein the temperature of the particulate material and gaseous effluent is at a level above the dewpoint of the water vapor therein, said method comprising the steps of:

directing said heated stream of effluent and particulate material into an upright centrifugal separation zone having a lower collection area and an upper discharge area;

causing said stream and particulate material to revolve in said zone at sufficient angular velocity to separate particulate material and fines form the gaseous effluent with the separated particulate material and fines gravitating toward the lower collection area of the zone while the gaseous effluent containing unseparated fines moves upwardly in the zone toward the discharge area thereof;

removing the collected particles and fines from the collection area of said centrifugal separation zone;

pneumatically conveying the collected particles and fines to a treatment zone remote from said centrifugal separation zone using a gaseous stream as a conveying medium therefor;

separating particulate material and at least some of the fines from the conveying gaseous stream;

returning all of the conveying medium and remaining fines to the separation zone;

bringing the returned conveying medium and remaining fines into direct contacting relationship with the heated stream of effluent and particulate material in said separation zone; and introducing a sufficient quantity of a cooling gas into the conveying fluid stream to reduce the mixture thereof to a temperature level sufficiently below the temperature level of the effluent and particulate material entering the separation zone to effect condensation of sufficient water vapor therein on the fines in the separation zone to enhance separation thereof and thus preclude discharge of undesirable quantities of particulate material from the zone into the atmosphere.

7. A method as set forth in claim 6 wherein the step of introducing sufficient cooling gas into said conveying medium includes adding cool air to the conveying fluid stream to assure reduction of the temperature thereof to said level for introduction into he separation zone.

8. A method as set forth in claim 6 wherein is included the step of introducing sufficient cooling gas into the conveying medium to lower temperature thereof at least about 100° F. lower than he temperature of the effluent directed to said separation zone.

9. A method as set forth in claim 6 wherein is included the step of returning a sufficient amount of said cooled conveying fluid to the separation zone at a temperature to cause the effluent introduced into said separation zone to be reduced to a temperature level approaching the dewpoint thereof.

10. A method as set forth in claim 6 wherein the conveying fluid returned to said separation zone contains sufficient fines which were not separated from the conveying fluid to serve as cool nuclei for enhancing condensation of moisture in the separation zone upon lowering of the temperature of the effluent introduced into said zone.

* * * * *